United States Patent
Mathewson et al.

(10) Patent No.: US 8,045,573 B2
(45) Date of Patent: Oct. 25, 2011

(54) BIT ORDERING FOR PACKETISED SERIAL DATA TRANSMISSION ON AN INTEGRATED CIRCUIT

(75) Inventors: Bruce James Mathewson, Papworth Everard (GB); Antony John Harris, Sheffield (GB)

(73) Assignee: ARM Limited, Cambridge (GB)

( * ) Notice: Subject to any disclaimer, the term of this patent is extended or adjusted under 35 U.S.C. 154(b) by 336 days.

(21) Appl. No.: 12/310,012

(22) PCT Filed: Aug. 16, 2006

(86) PCT No.: PCT/GB2006/003068
§ 371 (c)(1), (2), (4) Date: Feb. 6, 2009

(87) PCT Pub. No.: WO2008/020149
PCT Pub. Date: Feb. 21, 2008

(65) Prior Publication Data
US 2009/0323685 A1    Dec. 31, 2009

(51) Int. Cl.
*H04L 12/56* (2006.01)
*H04J 1/16* (2006.01)
(52) U.S. Cl. ......... 370/419; 370/463; 370/535; 709/203
(58) Field of Classification Search ........... 370/419, 370/463, 535; 709/203
See application file for complete search history.

(56) References Cited

U.S. PATENT DOCUMENTS 6,570,891 B1 *  5/2003  Arimilli ................ 370/536
7,693,188 B2 *  4/2010  Robinett et al. ........ 370/486

FOREIGN PATENT DOCUMENTS

WO  WO 2004/034176  4/2004
WO  WO 2006/048826  5/2006

OTHER PUBLICATIONS

International Search Report for PCT/GB2006/003068, mailed Dec. 22, 2006.
Written Opinion of the International Searching Authority for PCT/GB2006/003068, mailed Dec. 22, 2006.
ARM, "AMBA AXI Protocol V1.0 Specification", Internet Citation, [Online], (2003), 108 pages.
Franklin, W. Randolph, "Evaluation of Algorithms to Display Vector Plots on Raster Devices", Computer Graphics and Image Processing, vol. 11, (1979), pp. 377-397.
Abel, David J., "Bit-Interleaved Keys as the Basis for Spatial Access in a Front-End Spatial Database Management System", The British Library—"The World's Knowledge", Part 5, pp. 163-177, 1986.
Hutflesz, Andreas et al., "Globally Order Preserving Multidimensional Linear Hashing", IEEE, (1988), pp. 572-579.

(Continued)

*Primary Examiner* — John Pezzlo
(74) *Attorney, Agent, or Firm* — Nixon & Vanderhye P.C.

(57) ABSTRACT

An on-chip integrated circuit interconnect 16 uses a serialization technique to divide a transaction to be transmitted into a sequence of transmission packets which are serially transmitted over a narrower connection. The order in which bits of the transaction are allocated to transmission packets is selected such that higher priority bits required by a receiving slave device in order that it can commence processing the transaction are sent first. This reduces the latency of the system.

19 Claims, 5 Drawing Sheets

OTHER PUBLICATIONS

Figure 1:
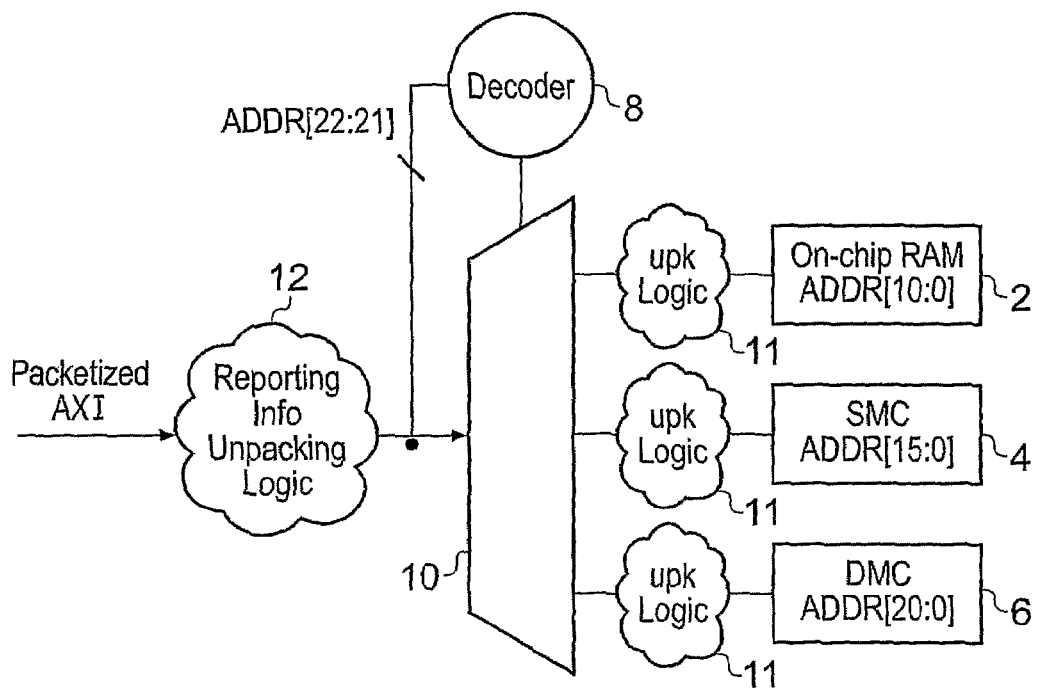

Mark, David M., "Neighbor-Based Properties of Some Orderings of Two-Dimensional Space", Geographical Analysis, vol. 22, No. 2, (Apr. 1990), pp. 145-157.

Burton, F. Warren et al., "Real-Time Raster to Quadtree and Quadtree to Raster Conversion Algorithms with Modest Storage Requirements", Angtewandte Informatik Apr. 1986, pp. 170-174.

Peuquet, Donna J., "An Examination of Techniques for Reformatting Digital Cartographic Data/Part 2: The Vector-to-Raster Process", Cartographica, vol. 18, No. 3, (1981), pp. 21-33.

Heckbert, Paul S. et al., "Computer Graphics and Applications", IEEE, vol. 6, Part II, (Nov. 1986), pp. 56-67.

Goodchild, Michael F. et al., "Optimizing Raster Storage: An Examination of Four Alternatives", Cartographica, vol. 21, Part 2/3, (1983), pp. 400-407 with cover page.

Burton, Warren F. et al., "Comment on 'The Explicit Quad Tree as a Structure for Computer Graphics'", The Computer Journal, vol. 26, No. 2, (1983), p. 188.

* cited by examiner

BIT ORDERING FOR PACKETISED SERIAL DATA TRANSMISSION ON AN INTEGRATED CIRCUIT

This application is the U.S. national phase of International Application No. PCT/GB2006/003068, filed Aug. 2006, which designed the U.S. the entire contents of which is hereby incorporated by reference.

This invention relates to the field of integrated circuits. More particularly, this invention relates to the transmission of transactions from a master device to a slave device by serially transmitting a plurality of transmission packets.

It is known to provide integrated circuits in which one or more master device is able to communicate with one or more slave devices by transmitting transactions therebetween. The most common way of transmitting these transactions is in parallel upon wide buses or through interconnect structures providing wide data paths. The data path width can be considerable. Thus, whilst parallel transmission on wide data paths provides good performance and throughput, it consumes a disadvantageous amount of circuit area and presents signal routing difficulties.

To address some of the above problems, it is known to provide on-chip networks to serially transmit transactions as a number of narrower transmission packets. An example of such a technique is described in "Networks On Chips: A New SoC Paradigm" by L Benini, et al, IEEE Computer, pages 70 to 78, January 2002. Such on-chip networks decode a transaction address as it enters the network and split it into a routing address (in a header) plus an intra-slave address (in the payload). This is analogous to the way a telephone system works in that the first part of an STD code in a telephone number identifies a relevant exchange and the remaining part the individual line attached to that exchange.

It will be appreciated that whilst transmitting transactions upon an integrated circuit as a sequence of transmission packets reduces the overhead associated with the number of signal lines that need to be provided, it has the disadvantage of slowing transmission of the transaction by moving it from parallel transmission to serial transmission. This can have particular consequences for increasing the latency associated with a transaction since a sequence of several transmission packets must be sent and received before the transaction can be reassembled at the receiver and acted upon. Increases in latency of this type are disadvantageous for many reasons.

Viewed from one aspect the present invention provides a method of transmitting data within an integrated circuit, said method comprising the steps of:

generating a transaction at a master device;

dividing said transaction into a plurality of transmission packets;

serially transmitting said plurality of transmission packets;

serially receiving said plurality of transmission packets;

combining said plurality of transmission packets to reform said transaction; and processing said transaction within a slave device; wherein said step of processing within said slave device is dependent upon at least a part of a multi-bit portion of said transaction;

said step of dividing allocates bits within said transaction to transmission packets in accordance with a priority ordering with higher priority bits being allocated to transmission packets transmitted before transmission packets containing lower priority bits;

bits within said multi-bit portion required by said slave device to commence said step of processing have a higher priority and are allocated to one or more transmission packets to be serially transmitted before one or more transmission packets carrying lower priority bits of said multi-bit portion; and said processing within said slave device responsive to said transaction commences after said transmission packets carrying said higher priority bits of said multi-bit portion have been received at said slave device and before said transmission packets carrying said lower priority bits of said multi-bit portion have been received at said slave device.

The present technique recognizes that by reordering the bits of data to be transmitted in the transaction such that the higher priority bits needed by the slave to commence processing of the transaction are sent first, then as the full transaction is being assembled at the receiver processing can be started using the higher priority bits even though the full transaction has not yet been received. This advantageously reduces the latency.

It will be appreciated that the transmission packets could have a wide variety of widths and it is possible that only a single bit could be sent at a time. However, in preferred embodiments the transmission packets are multi-bit transmission packets in which several bits are sent in parallel as a serial sequence of transmission packets, each packet comprising a plurality of bits sent in parallel.

It will be appreciated that the bits within the multi-bit portion which are required by the slave device to commence processing could take a variety of different forms such as one or more of a multi-bit address portion, a multi-bit control portion, a multi-bit identifier portion and a multi-bit response portion.

It will be appreciated that the slave devices could be connected to the master devices in a number of different ways. A traditional common bus approach could be used or alternatively a higher capacity interconnect approach.

The transaction requires routing through the interconnect in order to reach the slave. Thus, the transaction typically includes a decode portion which controls the routing and such a decode portion can be given a highest priority such that the routing can be accomplished as quickly as possible.

It will be appreciated that the priority ordering could be varied in dependence upon the particular slave to which a transaction is being sent. This would increase the advantage by tailoring the ordering to the individual transaction and slave combination. However, a useful compromise between performance and complexity is where the priority ordering is common to all of the plurality of slave devices. Such a fixed ordering can be made at design time and may include very little additional overhead.

When selecting the priority ordering a variety of different criteria may be used. This is particularly the case when the priority ordering is common amongst a plurality of slave devices. In such a context, one approach is to select the ordering such that the slave device having a highest bandwidth of transactions can commence processing as soon as possible. Another approach within an integrated circuit which has a low power mode, which will typically be used for a large majority of the time, is to select the priority ordering such that it is tailored to slave devices that are active in the low power mode. Another approach is to identify one or more slave devices which have highly critical functions (such as emergency or safety related functions) and arrange the priority order to enable such slave devices to commence processing as soon as possible.

As mentioned above, the priority ordering may be set at design time and fixed for an integrated circuit. Alternatively, more sophisticated embodiments may set the priority ordering at boot time with this being fixed subsequent to each boot of the integrated circuit. A further alternative is that the priority ordering is set at run time and is variable during running of the integrated circuit. The increased flexibility of the later approaches do however bring with them an additional overhead which may be justified in some circumstances.

It will be appreciated that the present technique may be used in a system having only a single master device. However, the invention is applicable to integrated circuits having a plurality of master devices.

Viewed from another aspect the present invention provides a method of transmitting data within an integrated circuit, said method comprising the steps of:

generating a transaction at a master device;

dividing said transaction into a plurality of transmission packets;

serially transmitting said plurality of transmission packets;

serially receiving said plurality of transmission packets;

combining said plurality of transmission packets to reform said transaction; and processing said transaction within a slave device; wherein said step of dividing operates such that one or more bits within said transaction that are not needed by said slave device are not allocated to a transmission packet and are not sent to said slave device.

It will be appreciated that having taken steps to divide the transaction into transmission packets talking account of the way in which the bits of the transaction will be used, it is also possible to drop one or more bits from the transaction which are not needed by the slave device and accordingly need not be allocated to a transmission packet and not sent to the slave device. This saves both time and power. This bit dropping may be used independently of the bit reordering.

Viewed from another aspect the present invention provides an integrated circuit comprising:

a master device operable to generate a transaction;

a transaction divider operable to divide said transaction into a plurality of transmission packets;

a serial transmitter operable to serially transmit said plurality of transmission packets;

a serial receiver operable to serially receive said plurality of transmission packets;

a transaction combiner operable to combine said plurality of transmission packets to reform said transaction; and a slave device operable to process said transaction; wherein said processing within said slave device is dependent upon at least a part of a multi-bit portion of said transaction;

said transaction divider is operable to allocate bits within said transaction to transmission packets in accordance with a priority ordering with higher priority bits being allocated to transmission packets transmitted before transmission packets containing lower priority bits; and bits within said multi-bit portion required by said slave device to commence said step of processing have a higher priority and are allocated to one or more transmission packets to be serially transmitted before one or more transmission packets carrying lower priority bits of said multi-bit portion; such that said slave device can commence processing in response to said transaction after said transmission packets carrying said higher priority bits of said multi-bit portion have been received at said slave device and before said transmission packets carrying said lower priority bits of said multi-bit portion have been received at said slave device.

Viewed from a further aspect the present invention provides an interconnect circuit for use within an integrated circuit comprising:

a transaction divider operable to divide a transaction received from a master device into a plurality of transmission packets;

a serial transmitter operable to serially transmit said plurality of transmission packets;

a serial receiver operable to serially receive said plurality of transmission packets; and a transaction combiner operable to combine said plurality of transmission packets to reform said transaction for processing by a slave device; wherein said processing within said slave device is dependent upon at least a part of a multi-bit portion of said transaction;

said transaction divider is operable to allocate bits within said transaction to transmission packets in accordance with a priority ordering with higher priority bits being allocated to transmission packets transmitted before transmission packets containing lower priority bits; and bits within said multi-bit portion required by said slave device to commence said step of processing have a higher priority and are allocated to one or more transmission packets to be serially transmitted before one or more transmission packets carrying lower priority bits of said multi-bit portion; such that said slave device can commence processing in response to said transaction after said transmission packets carrying said higher priority bits of said multi-bit portion have been received at said slave device and before said transmission packets carrying said lower priority bits of said multi-bit portion have been received at said slave device.

Viewed from a complementary aspect the present invention provides an interconnect circuit design tool comprising:

bit priority specifying code operable to specify a priority ordering of bits within a transaction to a slave device upon an integrated circuit, one or more bits with a higher priority when received by said slave device permitting said slave device to commence processing of said transaction prior to receiving bits of a lower priority;

allocating code responsive to said priority ordering to determine an allocation of bits of said transaction into respective transmission packets to be serially transmitted in a transmission order from a master device to said slave device; and transaction divider forming code operable to form a design for a transaction divider to divide a transaction into a sequence of serially transmitted transmission packets in accordance with said allocation of bits; and transaction combiner forming code operable to form a design for a transaction combiner to combine said sequence of serially transmitted transmission packets to reform said transaction.

It will be appreciated that in designing an interconnect exploiting the present techniques an interconnect design tool can be used which is able to respond to or generate the specification of a priority ordering of bits within a transaction and automatically form the relevant transaction divider and transaction combiner circuitry for use within the integrated circuit. Such transaction dividers and transaction combiners when provided statically may employ a rewiring (reordering) of the connections in accordance with the specified priority.

Figure 4:
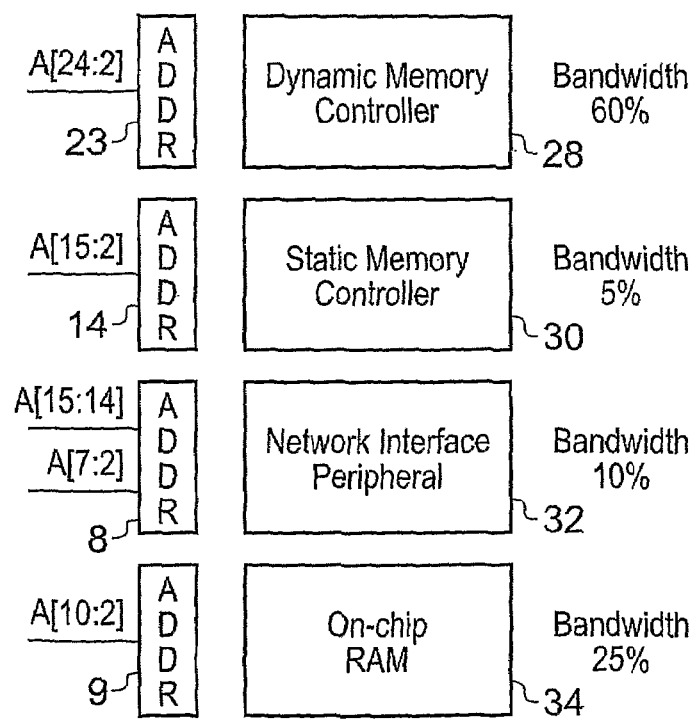
Figure 2:
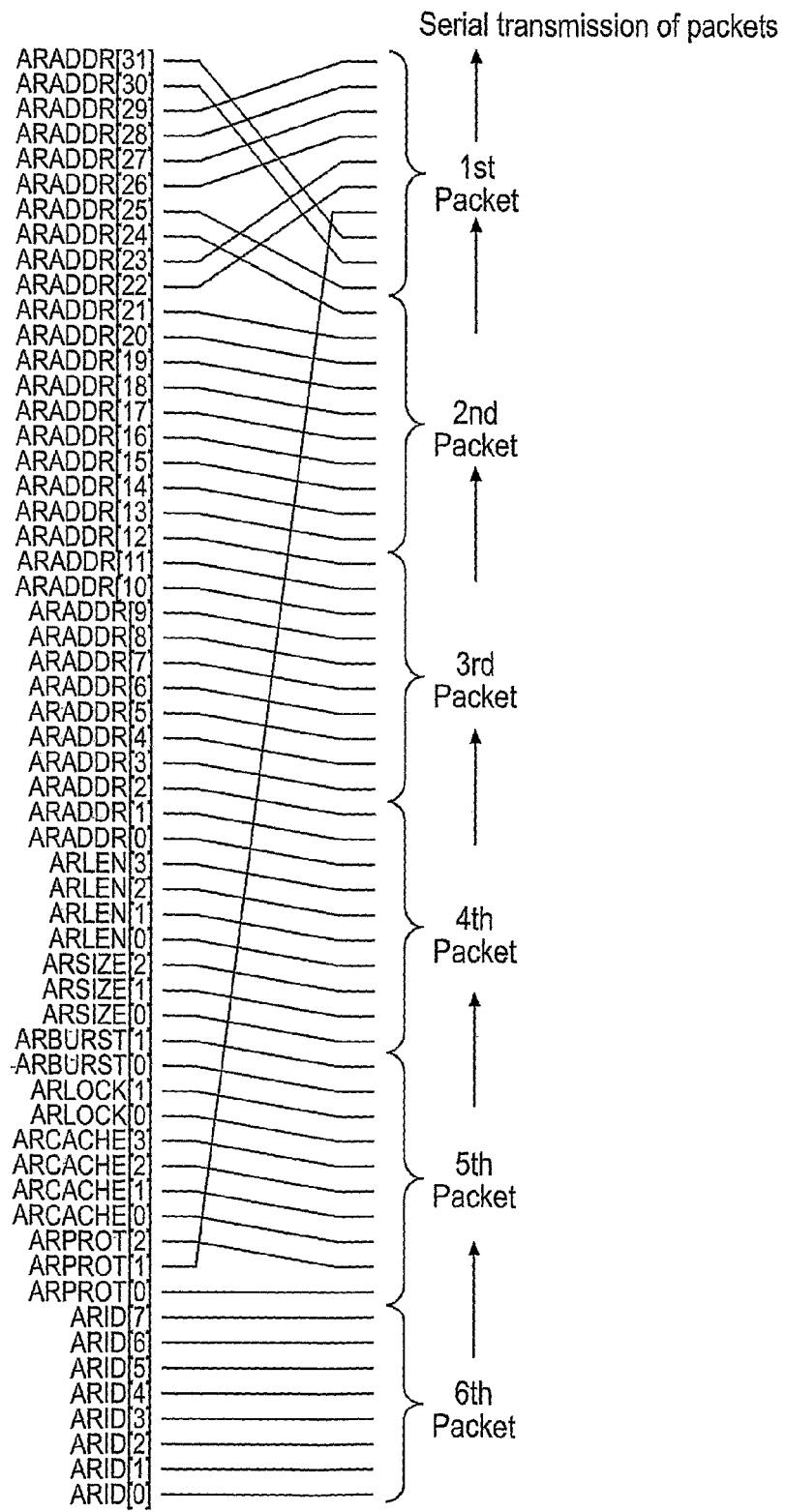
Figure 3:
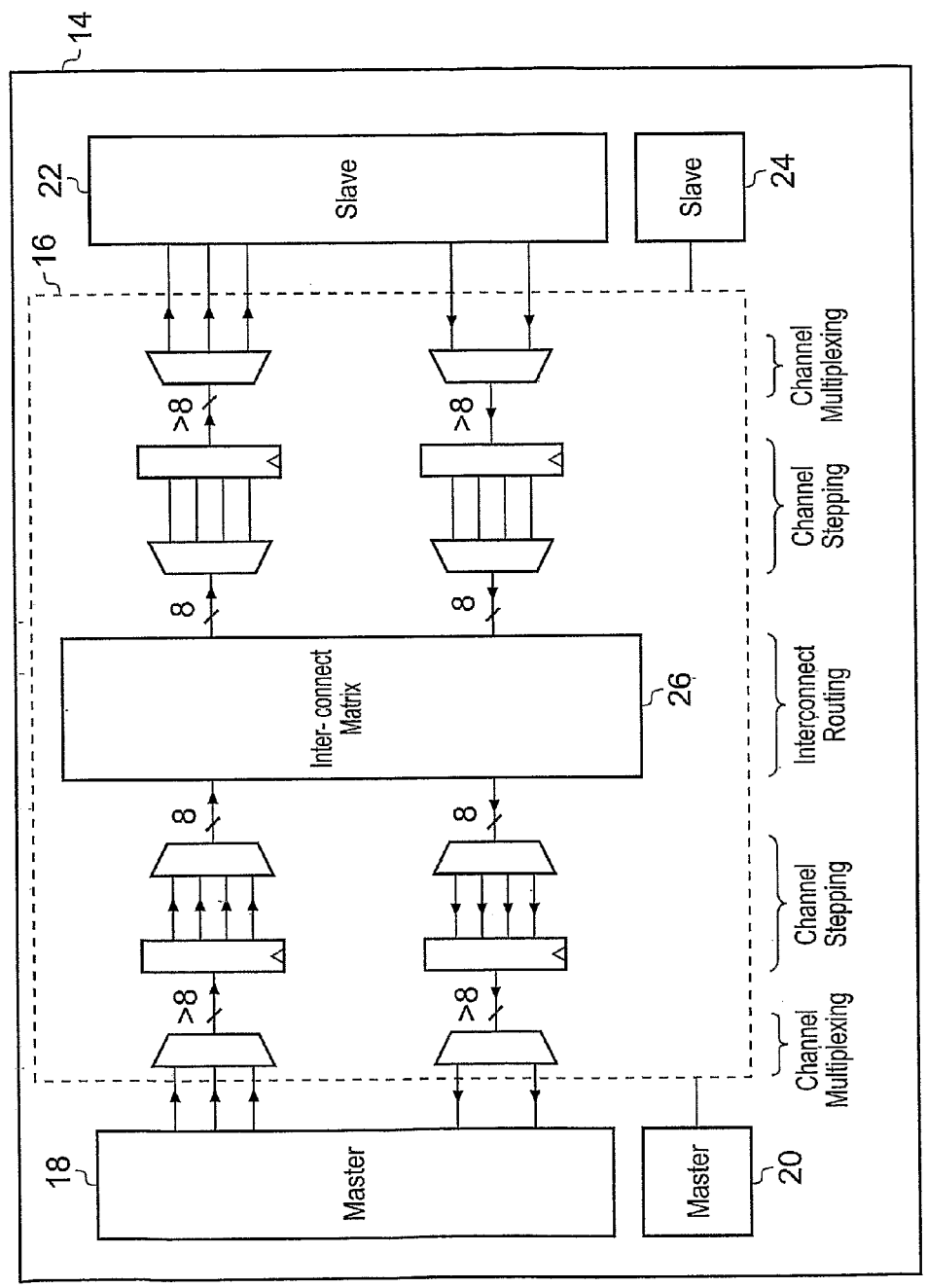
Figure 5:
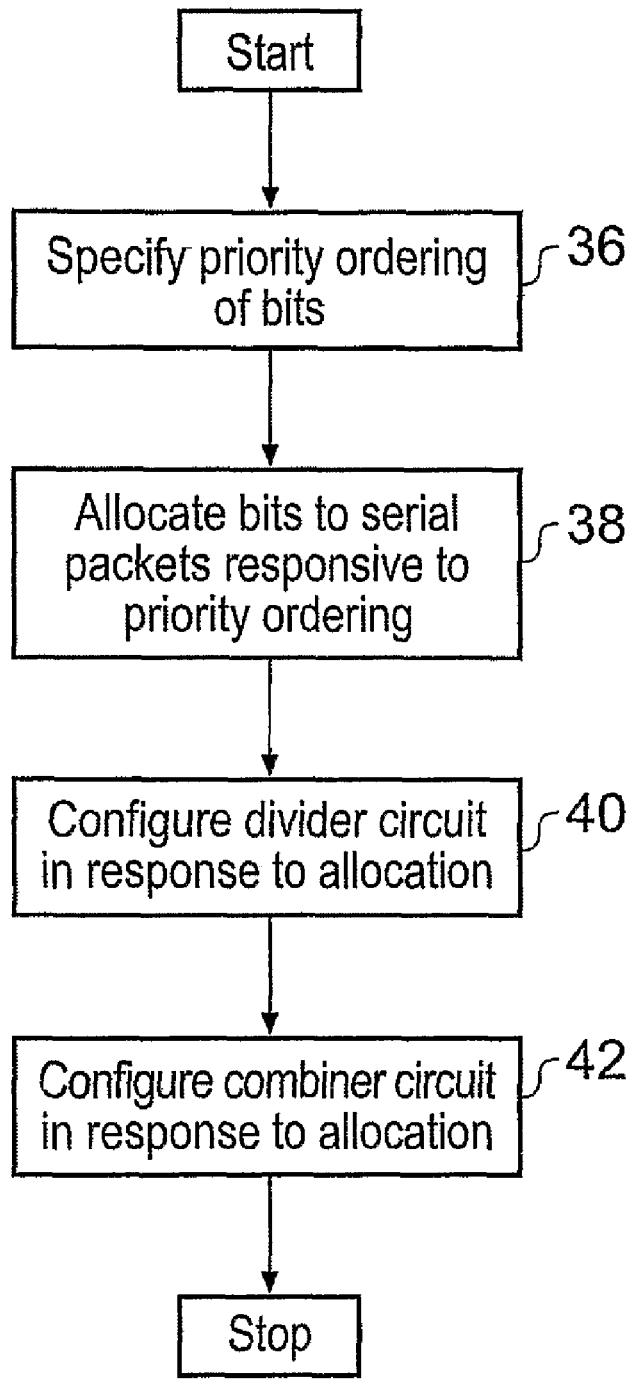
Figure 6:
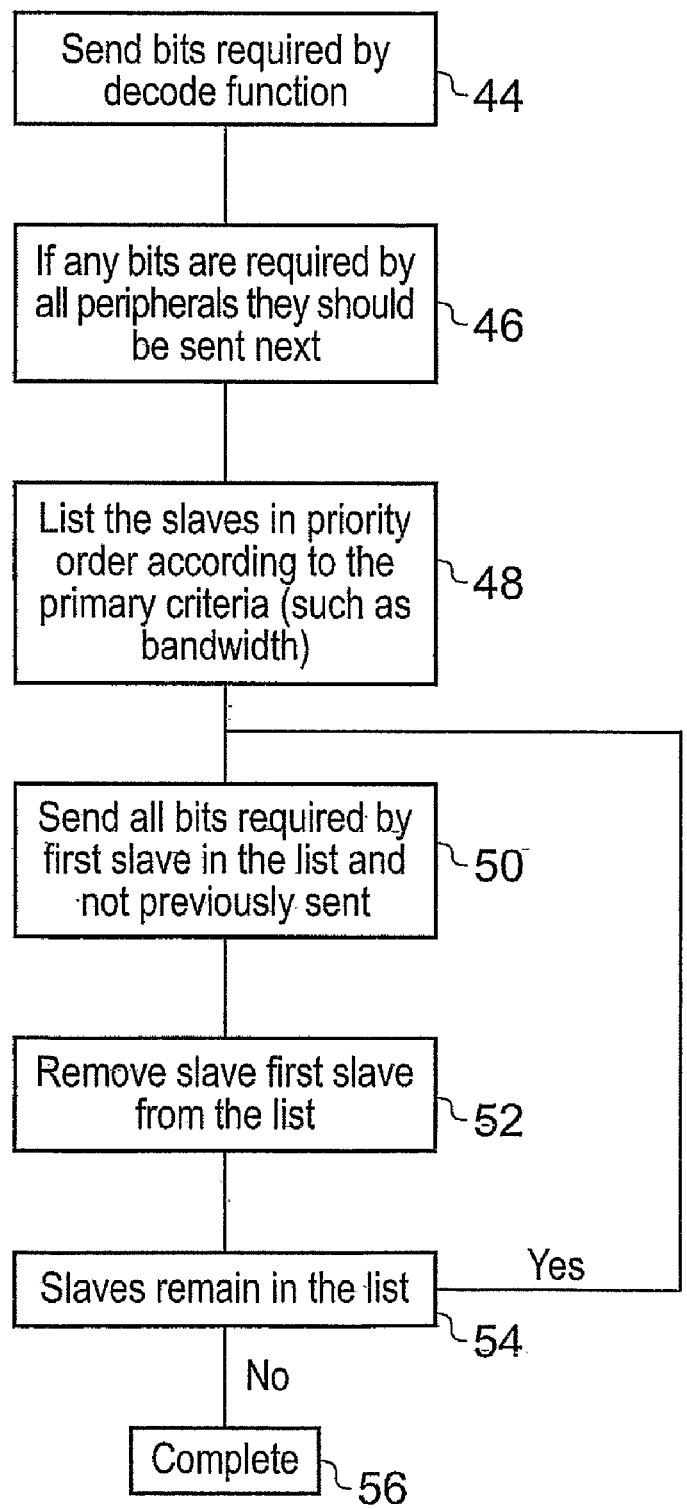

Embodiments of the invention will now be described, by way of example only, with reference to the accompanying drawings in which:

FIG. 1 schematically illustrates an arrangement for receiving a sequence of transmission packets directed to one of a plurality of slave devices;

FIG. 2 schematically illustrates the reordering of bits within a transaction in accordance with an identified priority hierarchy and the allocation of those bits to transmission packets;

FIG. 3 schematically illustrates an integrated circuit including a plurality of master devices, an interconnect and a plurality of slave devices;

FIG. 4 schematically illustrates the address bit requirements of a plurality of slave devices and their associated percentage usage of the available bandwidth;

FIG. 5 schematically illustrates a method of operating an interconnect design tool in accordance with an example of the present technique; and FIG. 6 schematically illustrates a flow diagram in which ordering of the bits taking into account the requirements of multiple slaves may be automatically established.

FIG. 1 schematically illustrates a plurality of slave devices 2, 4, 6 each with an associated position within the address space map of the system which can be distinguished based upon bits [22.21] of the memory address accompanying a bus transaction. Accordingly, these two bits ADDR[22:21] can be used by a decoder 8 to control a demultiplexer 10 so as to direct a received transaction to the appropriate bus slave 2, 4, 6.

In the example illustrated, the bus transaction has been serialized into the form of a sequence of transmission packets, e.g. a packetised AXI transaction. These transmission packets are sequentially received by routing information unpacking logic 12 which reassembles them to the extent required to recover the bits ADR[22:21] for use by the decoder 8. When the bits ADR[22:21] have been received, then these can be used by the decoder 8 to switch the demultiplexer 10 to direct the transaction to the appropriate one of the bus slaves 2, 4, 6. Further unpacking logic 11, 11' and 11" is provided between the demultiplexer 10 and the respective bus slave 2, 4, 6 for reform the required remaining portions of the transactions. It will be seen that once the transaction has been directed to a slave 2, 4, 6, that particular slave 2, 4, 6 may only be responsive to a portion of the full address (which would typically be 32-bits wide). If address bits [22:21] are placed in the first transmission packet, then the decoder 8 and the demultiplexer 10 can begin their operation sooner and start to direct the bits of the transaction as received to the appropriate slave 2, 4, 6 before the full transaction has been received. In the example of FIG. 1, it will be appreciated that none of the bits above ADDR[22] is used and accordingly such bits could be allocated a low priority and sent in the later transmission packet, or not sent at all.

FIG. 2 schematically illustrates a reordering of bits of part of a transaction to be sent prior to the transaction being divided into packets and serially transmitted. The different bits of the transaction are allocated different priorities and then ordered in accordance with those priorities. The ordered bits are then divided into a sequence of packets to be serially transmitted. In this way, the bits of the transaction with the highest priority will be sent first and received first by the slave. This allows the slave to start processing those bits earlier and commence processing of the overall transaction with reduced latency. In the example shown, it will be seen that transaction bit ARPROT[1] has been significantly reordered to a higher position so as to be transmitted earlier. There has also been some shuffling of the order of the bits ARADDR [31:22]. Shuffling within a packet will however have no significant effect. This is done so that the portions of the address bits ARADDR which are necessary to decode the transaction for routing purposes through an interconnect are available early and also a control bit ARPROT[1] is similarly available early since this relates to security and may be employed to prevent transmission occurring to non-secure slaves or for early security checking within a slave.

Similar techniques can also be applied to a data and a response channel of an AXI system. It would be possible to re-order the RID bits in order to send earlier decode bits first, or send a response first so an error could be ignored. Similarly, in the WDATA channel, the WSTRB bits could be sent first or WSTRB/WDATA sent such that active byte lanes were sent first.

FIG. 3 schematically illustrates an integrated circuit 14 including an interconnect 16 coupling a plurality of master devices 18, 20 to a plurality of slave devices 22, 24. The interconnect 16 receives on-chip transactions from the master devices 18, 20 for transmission to slave devices 22, 24 in accordance with the AXI protocol of ARM Limited. The AXI protocol uses five comparatively wide channels comprising read data, read address (which includes control data), write data, write address (which includes control data) and write response. These are the five channels which are supplied to the channel multiplexing stages of the interconnect 16.

In accordance with the present technique the wide buses associated with transmitting in parallel all of these five channels are replaced with narrower channels sent through an interconnect matrix 26. The data is packetised and serially transmitted over multi-bit, but much narrower serial channels as a sequence of transmission packets. In FIG. 3 the communication between a single master 18 and a single slave 22 is shown in detail. It will be appreciated that further masters 20 and further slaves 22 will also be connected through the interconnect 16 and will have their own channel multiplexing and channel stepping states, but share the interconnect matrix 26.

The transactions to be transmitted are received into registers within the channel stepping states of the interconnect 16. From these channel stepping stages individual collections of bits, each forming a transmission package, are selected (in an order which reflects their priority) by a multiplexer and supply into the interconnect matrix 26 for routing to the appropriate slave. At the channel stepping stage of the receiver, the transmission packets are reassembled to reform the transaction on the relevant channel. This is achieved via a demultiplexer writing into a register of sufficient width to store the whole of a transaction. The channel multiplexing stage directs the transaction to the appropriate channel of the AXI interconnect 16.

The present technique is expressed in the FIG. 3 embodiment in the order in which the bits of a transaction are selected by the channel stepping stages to be fed as transmission packets to the interconnect matrix 26 for serial transmission. Higher priority bits are selected first and transmitted first. This enables the receiver side to start processing those bits earlier. It will be appreciated that while the receiving channel stepping stage is continuing to assemble a full transaction, providing the relevant routing information has been derived from the bits already received in the transaction, then the partially received transaction can be supplied through to the slave 22 which can commence processing of that transaction.

FIG. 4 schematically illustrates a number of slave devices 28, 30, 32, 34 together with the associated portions of an address A[31:0] that forms part of transactions to which they are responsive. Also noted in FIG. 4 are the relative proportions of the bandwidth of the transactions connection concerned which are consumed by a particular slave device 28, 30, 32, 34.

It will be seen from FIG. 4 that the dynamic memory controller 28 consumes the majority of the bandwidth. However, it requires a large portion of the address bits A[24:2] in order to commence processing. This range of address bits also completely encompasses the address bits to which the remainder of the slave devices 30, 32, 34 are responsive and would take a minimum of three 8 bit transmission packets to transmit. If bandwidth were the only issue, then priority would be given to the requirements of the on-chip RAM 34 and the 9 bits comprising address bits A[10:2] would be given the highest priority and allocated to transmission packets as soon as possible. However, there is an additional subtlety depending upon the transmission packet size. In the case of the on-chip RAM 34, nine address bits are required before it can start processing. If the transmission packet size is eight bits then at least two packets will be required before the on-chip RAM 34 can commence processing since it needs all nine of these bits to decide where a particular transaction is to be addressed within its address space. In contrast to this, the network interface peripheral 34 uses eight bits from the address, namely bits A[15:14] and A[7:2]. It is possible within the constraints of eight bit transmission packets to send all of the eight bits required by the network interface peripheral 32 in the first transmission packet. This would allow the network interface peripheral 32 to commence operation as soon as the first transmission packet was received. The remainder of the bits of the address required by the on-chip RAM 34, namely bits [10:8] could be sent in the second transmission packet of the sequence. Thus, the on-chip RAM 34 would be able to start processing as soon as the second transmission packet was received, which would be the minimum in any case given that the example system is limited to eight bit transmission packets.

There would also be sufficient space within the second transmission packet of the sequence to include bits A[13:11] which would be required by the static memory controller 30 to start operation upon receipt of the second transmission packet. Accordingly, these bits would be allocated to the second transmission packet. Finally, within the remainder of the second transmission packet and part of the third transmission packet, the remaining bits A[24:16] required by the dynamic memory controller 28 would be sent. The dynamic memory controller 28 could thus start operation upon receipt of the third transmission packet, which would be the minimum necessary in any case.

Accordingly, whilst the dynamic memory controller 28 may have the highest bandwidth, in practice it is better in this example system to give the highest priority to the bits required by the network interface peripheral 32 followed by those bits required by the on-chip RAM 34 and the static memory controller 30. Finally, the bits required by the dynamic memory controller 28 could be sent.

It will be appreciated in FIG. 4 that none of the slave devices 28, 30, 32, 34 is responsive to bits A[1:0] and accordingly these may not be sent and so transmission time, power and resources may be saved. The bits required by the individual slave devices 28, 30, 32, 34 are known at design time and accordingly a design time tool may be used to specify the relative priorities of the bits required by the different slaves 28, 30, 32, 34 and then the appropriate divider and combiner circuits formed by a software tool.

The dividing and combining circuits may be static and fixed at design time or alternatively more sophisticated embodiments may be configurable that boot time or dynamically during run time. This would add complexity, but would also allow the integrated circuit to more readily adapt to changing conditions. As an example, in a high performance mode the priorities would be selected and the bits ordered for allocation to the transmission packets so as to satisfy the requirements of the highest bandwidth slave needed to achieve maximum performance. However, when the device was switched into a low power mode, that high performance slave may be powered down and accordingly the priorities adjusted to reflect the relative requirements of the slave which remain empowered during the low power mode.

In another example, one of the slaves might perform a particularly critical function, such as responding to fault conditions or by virtue of being responsible for operation of a safety critical device (e.g. a car braking system or an airbag system) and accordingly the bit priority ordering could be adjusted to reflect the requirements of that critical slave device so that it would be able to start its processing activities as soon as possible even though it was only rarely required to operate and the ordering would not suit the highest bandwidth devices. This would be a design choice and tradeoff which could be specified within the interconnect design tool where the priorities of the slave devices could be specified and associated with the bits to which they are responsive within the transaction.

FIG. 5 schematically illustrates a flow diagram showing the operation of a design tool for an integrated circuit interconnect. At step 36 a user specifies a priority ordering of the bits of a transaction. As discussed above, this may be achieved taking into account various properties and system requirements such as maximizing bandwidth, speed of critical operation, speed of operation in a particular mode etc. Once the requirements to commence processing of all of the slave devices were known, then these could be ANDed together to find those bits required for processing by all devices. These would be sent before bits which were not required for processing. The bits required could then be ORed together to find those required by at least one device. These bits could be sent next. The bits which were not required for processing by any device would in some embodiments be omitted. The omission of bits not required for processing may be used as a technique separately from the priority ordering technique, i.e. the bits of a transaction could maintain their relative ordering as they naturally appeared within the full width transaction, but those bits not actually required could be omitted from the transition and not form part of any of the transmission packets which are sent.

At step 38 the prioritized bits are allocated to serial packets in response to the priority ordering. It will be appreciated that the packet size may be taken into account in this allocation. As explained in relation to FIG. 4, it may be that limitations of the transmission packet size mean that the requirements of a particular high priority slave cannot in any case be met early and the flexibility of allocation is best utilized by improving the performance of what might appear lower priority slave devices.

At step 40 once the allocation of bits into the serial packets has been established, then a divider circuit needed to achieve this allocation can be configured. This divider circuit can be embodied as part of the channel stepping stage of FIG. 3 with a rewiring of bits in a static sense as shown in FIG. 2. The rewiring or reordering can also be made boot time or run time configurable with appropriate selectable multiplexers being used. This would increase the complexity and overhead associated with the technique.

At step 42 a combiner circuit is configured to reassemble the transmission packets to form the intended transaction. The combiner circuit is complementary to the divider circuit and can in a similar manner be formed by a simple rewiring of the connections or with selectable multiplexers.

FIG. 6 schematically illustrates the flow that an interconnect generation tool would follow in forming an interconnect taking account of the priority ordering of bits within a transaction. At step 44, the first bits to be sent may be selected as the bits required by the decode function to route the transaction to the appropriate slave. At step 46 the next bits selected are those required by all of the slave devices. At step 48 the slave devices are listed in priority order according to a particular criteria (such as bandwidth). This criteria may vary as previously discussed. At step 50 all the bits required by the first slave in the list are not previously sent are allocated for sending within a transmission packet. That slave is then removed from the list at step 52. If the determination at step 54, is that slaves remain in the list, then processing returns to step 50 at which the slave which is now first in the list is selected and all of its required bits are sent. Once all of the slaves in the list have had all of their bits sent then the allocation completes at step 56.

The invention claimed is:

1. A method of transmitting data within an integrated circuit, said method comprising the steps of:
   generating a transaction at a master device;
   dividing said transaction into a plurality of transmission packets;
   serially transmitting said plurality of transmission packets;
   serially receiving said plurality of transmission packets;
   combining said plurality of transmission packets to reform said transaction; and
   processing said transaction within a slave device; wherein
   said step of processing within said slave device is dependent upon at least a part of a multi-bit portion of said transaction;
   said step of dividing allocates bits within said transaction to transmission packets in accordance with a priority ordering with higher priority bits being allocated to transmission packets transmitted before transmission packets containing lower priority bits;
   bits within said multi-bit portion required by said slave device to commence said step of processing have a higher priority and are allocated to one or more transmission packets to be serially transmitted before one or more transmission packets carrying lower priority bits of said multi-bit portion; and
   said processing within said slave device responsive to said transaction commences after said transmission packets carrying said higher priority bits of said multi-bit portion have been received at said slave device and before said transmission packets carrying said lower priority bits of said multi-bit portion have been received at said slave device.

2. A method as claimed in claim 1, wherein said transmission packets are multi-bit transmission packets.

3. A method as claimed in claim 1, wherein said multi-bit portion is one or more of:
   a multi-bit address portion specifying an address within an address space;
   a multi-bit control portion for controlling how said slave device processes said transaction;
   a multi-bit identifier portion specifying an identifier for said transaction; and
   a multi-bit response portion indicating if said transaction has suffered an error.

4. A method as claimed in claim 1, wherein a plurality of slave devices are coupled via an interconnect to said master device.

5. A method as claimed in claim 4, wherein said transaction includes a decode portion controlling routing of said transaction through said interconnect such that said transaction reaches an intended slave device of said plurality of slave devices.

6. A method as claimed in claim 5, wherein bits of said decode portion have a highest priority within said transaction and said step of dividing allocates bits of said decode portion to transmission packets ahead of other bits of said transaction.

7. A method as claimed in claim 1, wherein said plurality of slaves are coupled via a common bus to said master device.

8. A method as claimed in claim 4, wherein said priority ordering used is varied in dependence upon to which of said plurality of slave devices said transaction is being transmitted.

9. A method as claimed in claim 4, wherein said priority ordering used is common to all of said plurality of slave devices.

10. A method as claimed in claim 9, wherein said priority ordering is selected such that a slave device of said plurality of slave devices having a highest bandwidth of transactions sent thereto can commence processing a transaction as soon as possible.

11. A method as claimed in claim 9, wherein said integrated circuit has a low power mode of operation in which only some of said plurality of slave devices are active and said priority ordering is selected such that a slave device active in said low power mode can commence processing a transaction as soon as possible.

12. A method as claimed in claim 9, wherein said priority ordering is selected such that a slave device of said plurality of slave devices having a most critical function can commence processing a transaction as soon as possible.

13. A method as claimed in claim 1, wherein said priority ordering is set at one of:
    at design time and is fixed for said integrated circuit;
    at boot time and is fixed subsequent to each boot of said integrated circuit; and
    at run time and variable during running of said integrated circuit.

14. A method as claimed in claim 1, wherein said step of dividing operates such that one or more bits within said transaction that are not needed by said slave device are not allocated to a transmission packet and are not sent to said slave device.

15. A method as claimed in claim 1, wherein said master device is one of a plurality of master devices.

16. A method of transmitting data within an integrated circuit, said method comprising the steps of:
    generating a transaction at a master device;
    dividing said transaction into a plurality of transmission packets;
    serially transmitting said plurality of transmission packets;
    serially receiving said plurality of transmission packets;
    combining said plurality of transmission packets to reform said transaction; and
    processing said transaction within a slave device; wherein
    said step of dividing operates such that one or more bits within said transaction that are not needed by said slave device are not allocated to a transmission packet and are not sent to said slave device.

17. An integrated circuit comprising:
    a master device operable to generate a transaction;
    a transaction divider operable to divide said transaction into a plurality of transmission packets;
    a serial transmitter operable to serially transmit said plurality of transmission packets;
    a serial receiver operable to serially receive said plurality of transmission packets;

a transaction combiner operable to combine said plurality of transmission packets to reform said transaction; and a slave device operable to process said transaction; wherein said processing within said slave device is dependent upon at least a part of a multi-bit portion of said transaction;

said transaction divider is operable to allocate bits within said transaction to transmission packets in accordance with a priority ordering with higher priority bits being allocated to transmission packets transmitted before transmission packets containing lower priority bits; and bits within said multi-bit portion required by said slave device to commence said step of processing have a higher priority and are allocated to one or more transmission packets to be serially transmitted before one or more transmission packets carrying lower priority bits of said multi-bit portion; such that said slave device can commence processing in response to said transaction after said transmission packets carrying said higher priority bits of said multi-bit portion have been received at said slave device and before said transmission packets carrying said lower priority bits of said multi-bit portion have been received at said slave device.

18. An interconnect circuit for use within an integrated circuit comprising:

a transaction divider operable to divide a transaction received from a master device into a plurality of transmission packets;

a serial transmitter operable to serially transmit said plurality of transmission packets;

a serial receiver operable to serially receive said plurality of transmission packets; and a transaction combiner operable to combine said plurality of transmission packets to reform said transaction for processing by a slave device; wherein said processing within said slave device is dependent upon at least a part of a multi-bit portion of said transaction;

said transaction divider is operable to allocate bits within said transaction to transmission packets in accordance with a priority ordering with higher priority bits being allocated to transmission packets transmitted before transmission packets containing lower priority bits; and bits within said multi-bit portion required by said slave device to commence said step of processing have a higher priority and are allocated to one or more transmission packets to be serially transmitted before one or more transmission packets carrying lower priority bits of said multi-bit portion; such that said slave device can commence processing in response to said transaction after said transmission packets carrying said higher priority bits of said multi-bit portion have been received at said slave device and before said transmission packets carrying said lower priority bits of said multi-bit portion have been received at said slave device.

19. An interconnect circuit design tool when executed on a controller, said tool comprising:

bit priority specifying code configured to specify a priority ordering of bits within a transaction to a slave device upon an integrated circuit, one or more bits with a higher priority when received by said slave device permitting said slave device to commence processing of said transaction prior to receiving bits of a lower priority;

allocating code, responsive to said priority ordering, configured to determine an allocation of bits of said transaction into respective transmission packets to be serially transmitted in a transmission order from a master device to said slave device; and transaction divider forming code configured to form a design for a transaction divider to divide a transaction into a sequence of serially transmitted transmission packets in accordance with said allocation of bits; and transaction combiner forming code configured to form a design for a transaction combiner to combine said sequence of serially transmitted transmission packets to reform said transaction.

\* \* \* \* \*